Oct. 18, 1966      W. JACOB      3,279,868
JOINT CONNECTION FOR ENDLESS TRACKS
Filed May 21, 1965      3 Sheets-Sheet 1

INVENTOR
WERNER JACOB

BY
Hammond + Littell
ATTORNEYS

Oct. 18, 1966    W. JACOB    3,279,868
JOINT CONNECTION FOR ENDLESS TRACKS
Filed May 21, 1965    3 Sheets-Sheet 3

INVENTOR
WERNER JACOB

BY
Hammond & Littell
ATTORNEYS

United States Patent Office 3,279,868
Patented Oct. 18, 1966

3,279,868
JOINT CONNECTION FOR ENDLESS TRACKS
Werner Jacob, Frankfurt am Main, Germany, assignor to Industriewerk Schaeffler oHG., Herzogenaurach, Germany, a corporation of Germany
Filed May 21, 1965, Ser. No. 457,756
Claims priority, application Germany, June 12, 1964, J 26,015
3 Claims. (Cl. 305—59)

The invention relates to novel joint connections for endless tracks of vehicles by means of a bolt connecting the reciprocally movable links.

Endless tracks are utilized on ground leveling machines, military vehicles such as tanks and self-propelled artillery and other vehicles. Due to the rough operation of these vehicles, the individual links of the endless tracks, particularly their connecting elements such as bolts and bearings, are subjected to an exceptionally high degree of stress. It has been found that roller bearings for the disposal of the bolts interconnecting the links are particularly not equal to the heavy stress made upon them and they, therefore, are apt to drop out before long.

It is an object of the invention to provide a novel joint connection for endless tracks which is easily replaced.

It is another object of the invention to provide a simple and easily manufactured joint connection for endless tracks.

These and other objects and advantages of the invention will become obvious from the following detailed description.

The novel joint connection of the invention for reciprocally movable members of an endless track is comprised of a bolt in direct engagement with bores in one movable member of the endless track and having a reduced diameter in the portion of the bolt within bores in the second member and roller bearings disposed in the bores of the second member for accommodating the portions of the bolt with the reduced diameter, the bores in the reciprocally movable members having identical diameters. The roller bearings are preferably needle bearings.

This construction has the advantage that when it is necessary to replace a damaged bearing, a new bolt already provided with roller bearings in its portions with reduced diameters is introduced into the bores from one side while simultaneously forcing the bolt with the damaged bearing out of the other end of the bore. This method of replacement is feasible because of the uniform diameters of the bores of the reciprocally movable members of the endless track and avoids the otherwise necessary opening of the endless track. Another advantage of the invention is that if a bolt provided with the roller bearings is not available when repair is necessary, a temporary repair can be made by replacing the bolt with the damaged bearing with a bolt having a uniform diameter corresponding with the diameter of the bore. In this way, the vehicle may be used until a proper repair can be made.

In a preferred embodiment, the bolt is manufactured in one piece whereby it is possible to produce the bolt in large quantities in a simple and economical manner with a free cutting or non-cutting manufacturing process. The bearings accommodating the bolt then consist of an outer race divided in the axial direction and a number of needle bearings disposed therein. However, it is also practical to construct the bolt of several parts with the parts to be accommodated in the roller bearings having a reduced outer diameter to accommodate the undivided outer race and needles. These parts can also be made in a simple way with a free cutting or non-cutting process. An advantage of the latter bolt is that needle bearings with undivided outer races may be used and thereby avoids the necessity of a special manufacturing process.

Referring now to the drawings.

Figure 1:
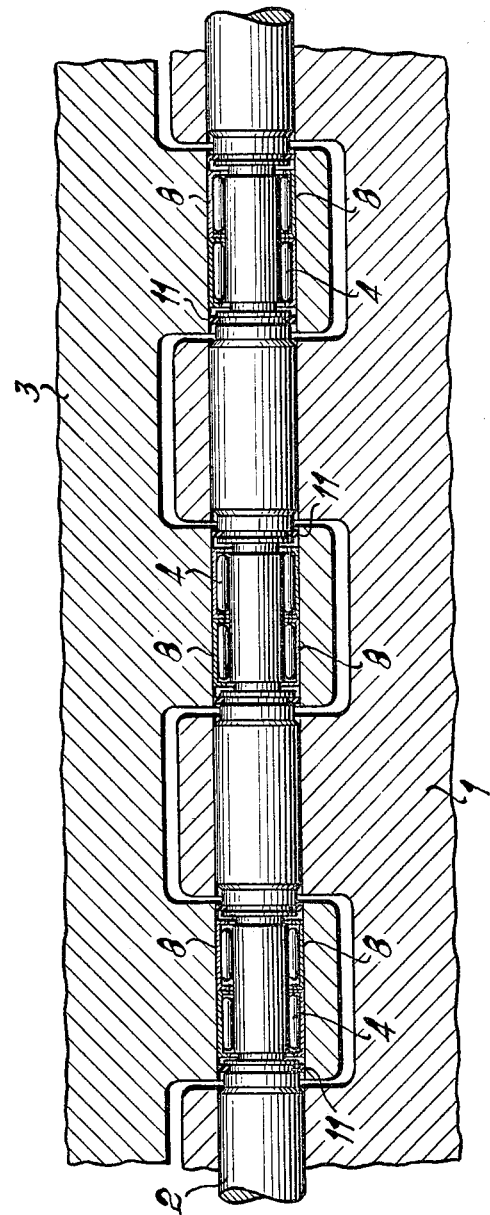
FIG. 1 is a cross-sectional view of an embodiment for the joint connection of two members of an endless track with a one-piece bolt and divided roller bearing outer races.

In FIG. 1, the link 1 of an endless track directly accommodates the one-piece bolt 2 which is disposed in endless track member 3 by means of needle bearings 4. The outer races 8 are divided in the axial direction in order to be placed on the bolt part which is reduced in its diameter. The needles 4 roll directly on the surface of bolt 2. The diameters of the bores of member 1 and of member 3 are of identical size.

Figure 2:
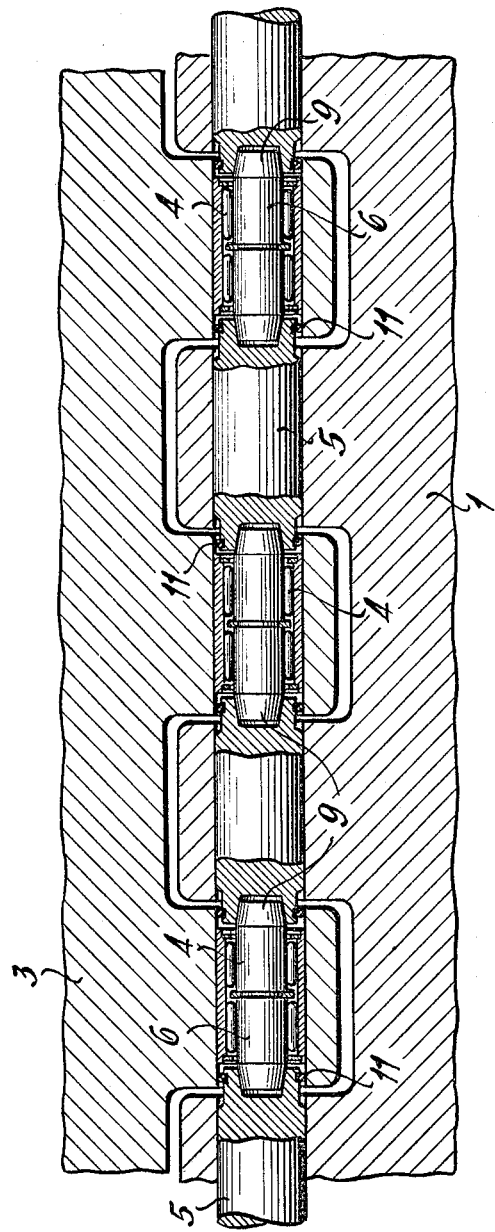
FIG. 2 and FIG. 3 are cross-sectional views of embodiments for the joint connection of two members of an endless track with bolts constructed of several parts.

In the construction of FIG. 2, the bolt is comprised of several parts 5 and 6. Part 6 in comparison with part 5 has a smaller outer diameter which conforms with the dimensions of the needle bearings 4. To couple parts 5 and 6 together, part 6 is provided with cone-shaped ends 9 which engage with corresponding recesses in bolt 5. The bolt parts are held together by any connecting means such as screws or the like not shown in FIG. 2.

Figure 3:
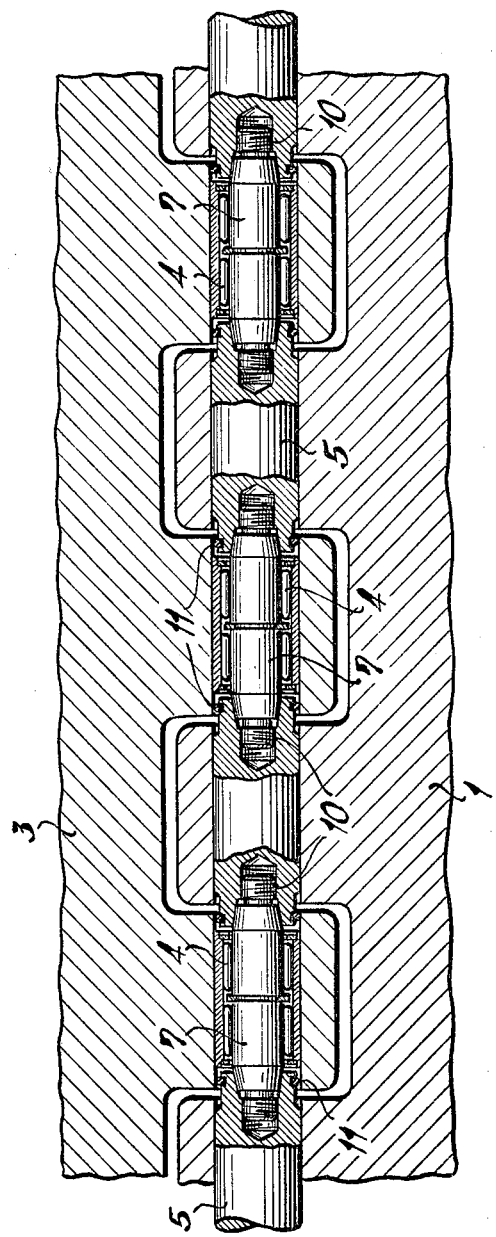

In the embodiment of FIG. 3, the bolt is comprised of several parts 5 and 7 with part 7 having a smaller outer diameter to conform with the dimensions of needle bearings 4. To couple parts 5 and 7 together, part 7 has at its ends threaded projections 10 which are screwed into threaded bores in part 5.

The sealing of the bearings is accomplished with circular pulley rings 11, which are disposed in grooves of bolt 2 of FIG. 1 and bolt part 5 of FIGS. 2 and 3. But it is also possible to accommodate the sealing means in grooves of the bores of the track members 3, in which the roller bearings are disposed.

Various modifications of the joint connection of the invention may be made without departing from the spirit or scope thereof and it is to be understood that the invention is to be limited only as defined in the appended claims.

I claim:

1. A joint connection of pivotally movable members of an endless track which comprises a bolt in direct engagement with bores in one movable member of the endless track and having a reduced diameter in the portion of the bolt within bores in the second member, said reduced diameter portion being provided with roller bearings which are disposed in the bores of the second member for accommodating the portions of the bolt with the reduced diameter, the bores in the pivotally movable members having identical diameters.

2. The joint connection of claim 1 wherein the bolt is a single piece and the roller bearing is comprised of axially divided outer races with needles disposed therein.

3. The joint connection of claim 1 wherein the bolt is comprised of several parts, the parts accommodated by the bearings having reduced outer diameters for engagement with the needle bearings which have undivided outer races.

References Cited by the Examiner
UNITED STATES PATENTS 2,342,675  2/1944  Knox _____ 305—14

FOREIGN PATENTS 559,124  9/1932  Germany.

OTHER REFERENCES

Wira: German printed application No. W25957, pub. Feb. 9, 1966.

BENJAMIN HERSH, *Primary Examiner.*

R. J. JOHNSON, *Assistant Examiner.*